US012654991B2

(12) United States Patent
Moran Garcia et al.

(10) Patent No.: US 12,654,991 B2
(45) Date of Patent: Jun. 16, 2026

(54) BOUNCE DAMPER FOR AN ELEVATOR SYSTEM

(71) Applicant: TK ESCALATOR NORTE, S.A., Mieres (ES)

(72) Inventors: Eduardo Moran Garcia, Gijón (ES); Luis Moran Bernardo, Oviedo (ES)

(73) Assignee: TK ESCALATOR NORTE, S.A., Mieres (ES)

( * ) Notice: Subject to any disclaimer, the term of this patent is extended or adjusted under 35 U.S.C. 154(b) by 0 days.

(21) Appl. No.: 18/848,763

(22) PCT Filed: Apr. 27, 2023

(86) PCT No.: PCT/EP2023/061082
§ 371 (c)(1),
(2) Date: Sep. 19, 2024

(87) PCT Pub. No.: WO2023/213672
PCT Pub. Date: Nov. 9, 2023

(65) Prior Publication Data

US 2025/0197167 A1 Jun. 19, 2025

(30) Foreign Application Priority Data

May 4, 2022 (EP) .................................... 22382429

(51) Int. Cl.
*B66B 11/02* (2006.01)

(52) U.S. Cl.
CPC ................................ *B66B 11/0293* (2013.01)

(58) Field of Classification Search
CPC .......................... B66B 11/0293; B66B 11/026
See application file for complete search history.

(56) References Cited

U.S. PATENT DOCUMENTS 5,379,864 A * 1/1995 Colby ..................... B66B 7/044
104/284
5,715,914 A * 2/1998 Traktovenko ........... B66B 7/046
187/406
(Continued)

FOREIGN PATENT DOCUMENTS

CN 205397800 U * 7/2016
EP 2370339 B1 8/2015
(Continued)

OTHER PUBLICATIONS

Machine Translation of CN 205397800.*

*Primary Examiner* — Diem M Tran
(74) *Attorney, Agent, or Firm* — Dinsmore & Shohl LLP

(57) ABSTRACT

Embodiments of the present disclosure are directed to a bounce damper for an elevator car being moveable by a tension member, including a first element configured to be fastened to the elevator car, a second element configured to be fastened to or to be in mechanic connection to an elevator shaft, wherein the first element and the second element are located adjacent to each other, wherein one out of the elements is an electromagnet and the other element is an armature being attracted to the electromagnet in the first horizontal direction by a magnetic force, when the electromagnet is magnetized, and wherein the electromagnet and the armature are spaced apart from each other in the first horizontal direction by a gap, when the electromagnet is magnetized.

7 Claims, 6 Drawing Sheets

(56) References Cited

U.S. PATENT DOCUMENTS

| | | | | |
|---|---|---|---|---|
| 6,408,987 | B2 * | 6/2002 | Morishita ............... | B66B 7/044 187/292 |
| 6,513,627 | B1 | 2/2003 | Cruise | |
| 7,793,760 | B2 * | 9/2010 | Ito ........................... | B66B 7/044 187/292 |
| 8,342,293 | B2 * | 1/2013 | Ito ........................... | B66B 7/044 187/292 |
| 9,114,954 | B2 * | 8/2015 | Boschin .................... | B66B 5/02 |
| 9,688,512 | B2 | 6/2017 | West et al. | |
| 10,329,123 | B2 * | 6/2019 | Blanc ...................... | B66B 9/003 |
| 10,494,228 | B2 | 12/2019 | Swaybill et al. | |

FOREIGN PATENT DOCUMENTS

| | | | |
|---|---|---|---|
| EP | 2655233 | B1 | 4/2017 |
| EP | 2840055 | B1 | 10/2019 |
| KR | 20050008275 | A * | 1/2005 |

* cited by examiner

BOUNCE DAMPER FOR AN ELEVATOR SYSTEM

CROSS REFERENCE TO RELATED APPLICATIONS

The present application is the National Phase entry of International Patent Application PCT/EP2023/061082, filed Apr. 27, 2023, which in turn claims priority benefit to European Patent Application 22382429.3, filed May 4, 2022, the entire contents of both which are hereby incorporated by reference into this application.

TECHNICAL FIELD

The present disclosure generally relates to elevator systems, including at least one elevator car being carried by a tension member and being movable upward and downward in a vertical elevator shaft by an elevator drive. More particularly, the present disclosure is directed to a bounce damper for preventing the elevator car from bouncing due to change of weight and/or passenger movement, such as in a lower part of the elevator shaft.

BACKGROUND

Elevators for vertically transporting people and goods are an integral part of modern residential and commercial buildings. A typical elevator system includes one or more elevator cars raised and lowered in an elevator shaft by an elevator drive placed above the elevator shaft. An elevator drive typically includes driven sheave assemblies over which one or more tension members attached to the elevator car are driven. Usually, the tension member is connected to a counter weight on an end opposite to the elevator car. The elevator car is raised or lowered due to traction between the tension members and drive sheaves, while the counter weight is lowered or raised accordingly. A variety of tension member types, including wire rope, V-belts, flat belts, and chains, may be used, with the sheave assemblies having corresponding running surfaces to transmit tractive force between the tension members and the sheave assemblies.

With increased height of modern buildings, elevator shafts extend over long vertical distances and the length of the tension members increases accordingly. The axial strain in response to tensile stress of the tension member accumulates over the length of the tension member between the car and the elevator drive. Thus, when the car is in a position low enough, a significant stretchability, respectively a low stiffness, of the tension member occurs. This may result in oscillations, when a force is applied on the elevator car in the vertical direction. Such oscillations resulting from entering, leaving or other movement of passengers at a stop of the elevator car is called bouncing and may possibly be disturbing, frightening and/or alarming for the passengers. Bouncing may occur when the elevator car enters into resonance.

It is common in the state of the art, to prevent bouncing with a bounce damper located at the elevator car, which may or may not be a separate part from an elevator car brake. Such a bounce damper usually includes a friction member at the elevator car, which is pressed against another friction member in the elevator shaft at a stop. In this way, a friction force on the elevator car in the vertical direction occurs, which dampens the bouncing. The friction force changes the elevator cars vibration mode, respectively the resonance frequency and thereby prevents the elevator car from entering into resonance.

A predescribed bounce damper is exemplarily disclosed in U.S. Pat. No. 9,688,512 B2, EP 2 840 055 B1, U.S. Pat. No. 10,494,228 B2, EP 2 655 233 B1 or EP 2 370 339 B1. Disadvantageously, such bounce dampers require complex mechanical actuation to press the friction members against each other at elevator car stops and release the friction members during hoisting of the elevator car. Further, in such bounce dampers based on the principal of friction, wear occurs, which lead to the need for maintenance and results in abrasion dust in the elevator shaft.

SUMMARY

In view of the state of the art, a need exists for less complex device to prevent the elevator car from bouncing with a reduced need for maintenance. It is therefore an object of the present disclosure to suggest such a bounce damper.

This object is solved by the features of the independent claims. Advantageous embodiments are indicated in the dependent claims. Where technically possible, the features of the dependent claims may be combined as desired with the features of the independent claims and/or other dependent claims.

In particular, the object is solved by a bounce damper for an elevator car being moveable in a vertical extending elevator shaft by a tension member, the bounce damper including a first element configured to be fastened to the elevator car, and at least one second element configured to be fastened to the elevator shaft at a stop of the elevator car, wherein, when the elevator car is at the stop, the first element and the second element are located adjacent to each other in a first horizontal direction, wherein one out of the first element or second element is an electromagnet, wherein the other out of the first element or second element is an armature being attracted to the electromagnet in the horizontal direction by a magnetic force, when the electromagnet is magnetized, and wherein the electromagnet and the armature are spaced apart from each other in the horizontal direction by a gap, when the electromagnet is magnetized.

As elements are designated with the aid of numbering, for example "first element", "second element" and "third element", this numbering is provided purely for differentiation in the designation and does not represent any dependence of the elements on one another or any mandatory sequence of the elements. In particular, this means that a device need not have a "first element" in order to have a "second element". Also, the device may comprise a "first element", as well as a "third element", but without necessarily having a "second element". Multiple units of an element of a single numbering may also be provided, for example multiple "first elements".

The tension member may be for example a rope, a V-belt, a flat belt, or a chain. The tension member may further contain more than one strand such as of the same kind and is connectable to an elevator drive above the elevator shaft, which may be located in a separate engine room or in a shaft head and contain a sheave which receives the tension member, respectively the strands of the tension member. The elevator car may further be guided on at least one guiding rail or the like. In some embodiments, the elevator car includes at least one guiding wheel for rolling along a guiding rail or guiding rails.

As the first element is fastened to the elevator car and the second element is fastened to the elevator shaft, they are fastened in a ridged manner at least in the vertical direction. In some embodiments, the elements are both fastened in a rigid manner also in a second horizontal direction perpendicular to the first horizontal direction. In some embodiments, at least one out of the first element and the second element is fastened in a rigid manner also in the first horizontal direction. A rigid manner means that the element cannot move in the referenced direction without the elevator car respectively the elevator shaft being moved in this direction. Thus, the element cannot move against but does move together with the elevator car respectively the elevator shaft in the referenced direction. The elements for example may be fastened by screws or the like or may be an integral part of the elevator car respectively the elevator shaft.

When the second element is configured to be in mechanic connection to the elevator shaft that means that by this mechanic connection a force at least in the vertical direction can be transferred between the second element and the elevator shaft. For example, such a second element may be formed by a guiding wheel for rolling along the guiding rail or guiding rails, which has a running surface made from rubber that is in friction contact with the guiding rail. Thus, when the wheel is hold fast against the elevator car by the bounce damper, the elevator car cannot move or only move at increased resistance against the elevator shaft in the vertical direction due to the friction contact, so that a dampening effect results.

A stop of the elevator car may be defined by a landing door in the elevator shaft located at the particular position of the stop. The elevator car is configured to be stopped so that the landing door of the elevator shaft aligns with a door of the elevator car. The bounce damper may or may not be used as a brake to stop the elevator door in alignment with the landing door. For example, the bounce damper may be used in auxiliary manner beside an elevator brake in or at the elevator drive. Usually, a landing door is located at a floor of a building, wherein more than one floors have a landing door, which can be reached by the elevator car at respective stops. In some embodiments, a second element is fastened to the elevator shaft at more than one stop, such as at every stop. The second element may also extend along the elevator shaft and thereby along a number of stops.

As the first element and the second element are located adjacent to each other in a first horizontal direction, they align in this first horizontal direction. Thus, the first element and the second element are located in line with each other along the first horizontal direction with the gap between them, when the electromagnet is magnetized.

The armature is of a magnetic material and may be fastened to the elevator car or the elevator shaft, may be an integral part of the elevator car or the elevator shaft or may be an integral part of another element fastened to the elevator car or the elevator shaft, such as a guiding rail or an elevator car frame. At least, a magnetic area or surface is provided, which is located adjacent to the electromagnet and forms the armature.

Within the described bounce damper, a magnetic force is generated in the first horizontal direction without the first element and the second element being in contact with each other, when the electromagnet is magnetized, thus when an electric current is supplied to the electromagnet. The magnetic force in the first horizontal direction results in a force in the vertical direction in answer to a dislocation of the elements against each other, when the armature is pulled away from the electromagnet in the vertical direction. This force is thus acting against a dislocation of the elevator car from the exact stop position as it occurs due to bouncing and thus dampens the elevator car from bouncing. The magnetization of the electromagnet does not require any mechanical actuation of any part but is actuated by supplying a current. It is therefore less complex and fail-safe to actuate the bounce damper. Fail-safety can further simply be increased by providing redundant means for supplying current to the electromagnet. Further, the bounce damper works contactless and is therefore not exposed to wear. Thus, the need for maintenance and pollution in the elevator shaft are reduced.

In embodiments of the described bounce damper, the first element is the electromagnet and the second element is the armature. Thus, the electromagnet is fastened to the elevator car and only one electromagnet must be provided per elevator car. As usually the number of elevator cars is much less than the number of stops, the number of electromagnets is less than the number of armatures, when the bounce damper is installed at a significant number of stops at least in a low section of the elevator shaft. With the electromagnet being the more expensive and more complex component than the armature, the embodiment is less complex and cheaper over an embodiment, wherein the second element is the electromagnet.

In another embodiment, the armature is formed by a guiding rail mounted in the elevator shaft for guiding the elevator car along the elevator shaft. No additional component to form the armature is necessary in this embodiment. As such guiding rails are usually formed from a magnetic material, they can easily be utilized as armatures. Further, guiding means at elevator cars such as guiding wheels are usually fastened to frames or racks running close to the guiding rails, which may provide a mounting location for the electromagnet and thus allow simple assembly of the bounce damper. Alternatively, the armature is fastened to a guiding rail mounted in the elevator shaft for guiding the elevator car along the elevator shaft. In this embodiment, the armature can at least be placed and fasted in a simple and inexpensive way and the electromagnet can be mounted in a corresponding mounting location at the frame or rack for simple assembly of the bounce damper.

In a further embodiment, the at least one out of the first element or second element is moveable in the first horizontal direction between a first position and a second position, wherein the element is spring-loaded in the direction of the first position, and wherein the element is attracted in the direction of the second position by the magnetic force. In the first position, the first element and the second element are spaced apart from each other sufficiently to prevent any contact which could disturb the movement of the elevator car along the elevator shaft. Thus, the bounce damper is in a stand-by-mode for the movement of the elevator car, e.g. between two stops. The moveable element is forced into the first position by the spring load, when the electromagnet is not magnetized and/or the elements are not located adjacent to each other or at least close to each other in the vertical direction. In the first position, the elements may be spaced apart from each other by at least 5 millimeters.

In the second position, the elements are close enough to each other to generate a sufficient magnetic force to dampen the elevator car but are still spaced apart by the gap. The gap may for example be 1 to 3 millimeters wide in the second position. When the electromagnet is supplied with current, the magnetic force exceeds the spring load to force the moveable element into the second position. The second position is therefore an activated position of the bounce damper. In some embodiments, the first element is the moveable element, so that only one moveable element per elevator car must be provided and not one element per stop.

In another embodiment, at least one out of the first element or second element includes a non-magnetic spacer, wherein the spacer contacts the other out of the first element or second element to determine the gap, when the electromagnet is magnetized. The gap is therefore well defined to ensure a sufficient magnetic force for bounce damping while the elements are still spaced apart. In some embodiments, the spacer may be utilized to define the second position of a moveable element. The spacer may be placed at one of the elements at a particular position or may extend over an area of one out of the first element or second element. The spacer may further be positioned in the gap or apart from the gap. As the spacer is non-magnetic, it does not interfere with the magnetic attraction between the first element and the second element. In some embodiments, the spacer is from a plastic material, such as PTFE, PUR, PA or the like. Plastic material advantageously is non-magnetic, has low friction coefficients and good wear resistance.

The object is also solved by a bounce damper for an elevator car being moveable in a vertical extending elevator shaft by a tension member, the bounce damper including a first element configured to be fastened to the elevator car, at least one second element configured to be fastened to the elevator shaft at a stop of the elevator car, wherein one out of the first element or second element is a magnet generating a magnetic field having field lines in a first horizontal direction, wherein the other out of the first element or second element is a conductor, wherein the conductor is located in the magnetic field, when the elevator car is at the stop, so that eddy currents are induced in the conductor, and wherein the conductor is spaced apart from the magnet at the stop. Also with this bounce damper, a force is generated in the vertical direction, this time in answer to the vertical movement speed of the conductor in the magnetic field, without the first element and the second element being in contact with each other. This force is acting against a dislocation of the elevator car from the exact stop position as it occurs due to bouncing and thus dampens the elevator car from bouncing. The placement of the conductor in the magnetic field, when the elevator car is at the stop, can be archived by simple means without mechanic actuation or with very simple mechanic actuation without the need for a contact force. It is therefore less complex and fail-safe to actuate the bounce damper over a friction damper. The bounce damper works contactless and is therefore not exposed to wear. Thus, the need for maintenance and pollution in the elevator shaft are reduced.

To generate the vertical force, the conductor needs to be positioned in the magnetic field, when the elevator car is at the stop. The conductor must however not be positioned in the magnetic field when the elevator car is supposed to move, since otherwise the eddy currents would break or prevent such desired movement. One way to fulfill both these conditions is to provide an electromagnet as magnet, which is turned on, when the conductor is positioned in the according position at the stop and can be turned off, when the car is supposed to move from the stop. Such an electromagnet can be simply actuated by supplying current without the need for any mechanic actuation. The conductor meanwhile can simply be positioned in a rigid manner in all directions on the elevator car or the elevator shaft. In some embodiments, an electromagnet is fastened to the elevator car as it is the less complex component over the conductor and must be less often provided in the elevator system, when fastened to the elevator car.

Another way to fulfill both conditions is to utilize a permanent magnet as a magnet and to position the conductor in the magnetic field at the exact stop exclusively.

In one embodiment, in particular with a permanent magnet as magnet, at least one out of the first element or second element is moveable in a horizontal direction between a first position and a second position, wherein the conductor is located in the magnetic field in the first position, and wherein the conductor is located away from the magnetic field in the second position. The moveable element can be mechanically actuated in a simple manner and allows a fast activation/deactivation for holding the elevator car or respectively move the elevator car. The moveable element may be fastened to the elevator car, so that mechanical actuation must be provided less often in the elevator system than when fasten the moveable element to the elevator shaft at several stops.

In some embodiments, the conductor is the second element and is formed by a guiding wheel fastened to the elevator car for guiding the elevator car along a guiding rail mounted in the elevator shaft. Said guiding wheel is configured to be in mechanic connection to the elevator shaft by being in friction contact with a guiding rail in the elevator shaft. By holding the guiding wheel against the car, the car is thus hold against the guiding rail accordingly. Advantageously, both elements have to be provided only once per elevator car and no further conductor beside the guiding wheel has to be provided.

The object is further solved by an elevator car configured to be moveable in a vertical extending elevator shaft by a tension member, including a first element or second element of a predescribed bounce damper, wherein the element is moveable in a horizontal direction between a first position and a second position. The elevator car can be utilized in a respective embodiment of a bounce damper according to the predescribed and thereby archives the advantageous previously described accordingly.

The object is further solved by an elevator shaft for receiving an elevator car described in the preceding paragraph, including a magnet of a predescribed bounce damper. The elevator car and the elevator shaft together form the predescribed bounce damper with according advantageous.

The object is furthermore solved by an elevator car configured to be moveable in a vertical extending elevator shaft by a tension member, comprising a magnet of a predescribed bounce damper. Also this elevator car can be utilized in a respective embodiment of a bounce damper according to the predescribed and thereby archives the advantageous previously described accordingly.

The object is also solved by an elevator system including an elevator shaft, at least one elevator car being moveable in a vertical direction along the elevator shaft by a tension member, and at least one predescribed bounce damper. Such an elevator system archives the predescribed advantageous accordingly.

BRIEF DESCRIPTION OF THE FIGURES

In the following, the invention is explained in more detail with reference to the accompanying figures using preferred examples of embodiments. The formulation figure is abbreviated in the drawings as Fig.

DETAILED DESCRIPTION OF THE EMBODIMENTS

The described embodiments are merely examples that can be modified and/or supplemented in a variety of ways within the scope of the claims. Any feature described for a particular embodiment example may be used independently or in combination with other features in any other embodiment example. Any feature described for an embodiment example of a particular claim category may also be used in a corresponding manner in an embodiment example of another claim category.

Figure 1:
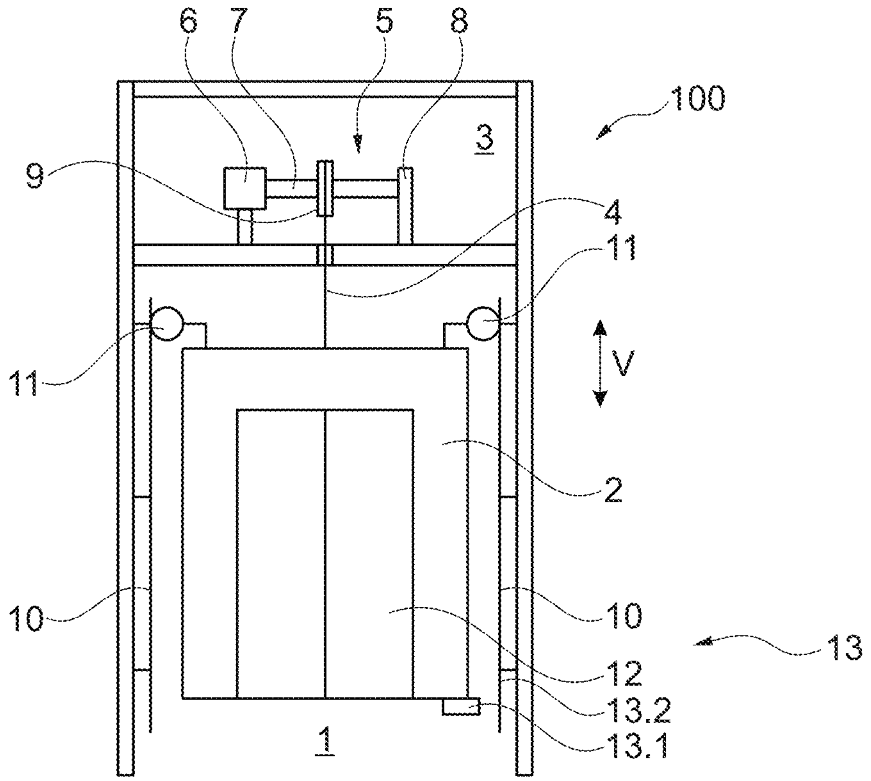
FIG. 1 is a schematic view of an elevator system according to an embodiment of the invention.

FIG. 1 shows a schematic and simplified view of an elevator system 100 including an elevator shaft 1, extending in a vertical direction V, in which an elevator car 2 is moveable upwards and downwards. Above the elevator shaft 1, an engine room 3 is located. The elevator car 2 is carried by a tension member 4 such as a rope, a belt or a chain, which extends into the engine room 3. In the engine room 3, an elevator drive 5 is located, having a drive unit 6 such as an electric motor/generator, driving a drive shaft 7. The drive unit 6 might further include a breaking device not shown in FIG. 1 for breaking the elevator car 2 during operation of the elevator system 100, e.g. at a stop. The drive shaft 7 is mounted in a bearing 8 on its end adjacent to the drive unit 6. On the drive shaft 7, a driven sheave 9 is mounted, which receives the tension member 4 and drives the tension member 4 due to traction between the sheave 9 and the tension member 4. The tension member 4 is connected to a counter weight not shown in the figures on its end adjacent to the elevator car 2.

The elevator shaft 1 includes guiding rails 10, along which the elevator car 2 is guided by guiding wheels 11 fastened to the elevator car 2. The elevator car 2 further includes an elevator door 12, which is configured to align with a landing door at a stop and allows passengers to enter or leave the elevator car 2. The elevator car 2 further includes a first element 13.1 of a bounce damper 13, wherein the guiding rail 10 forms a second element 13.2 of the bounce damper 13.

Figure 2:
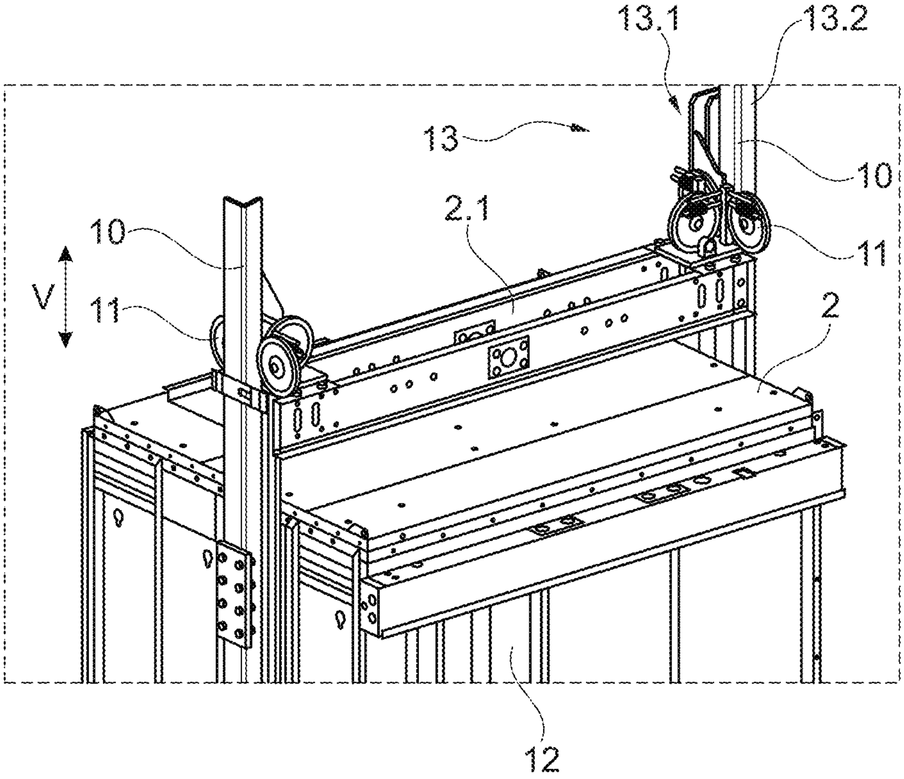
FIG. 2 is a perspective view of an elevator car with a bounce damper according to an embodiment of the invention.

FIG. 2 shows another embodiment of the present disclosure. An elevator car 2 has a car frame 2.1, on which guiding wheels 11 are fastened to guide the elevator car 2 along guiding rails 10. Above the guiding wheels 11, a first element 13.1 of a bounce damper 13 is fastened to the car frame 2.1. The guiding rail 10 forms the second element 13.2 of the bounce damper 13.

Figure 3:
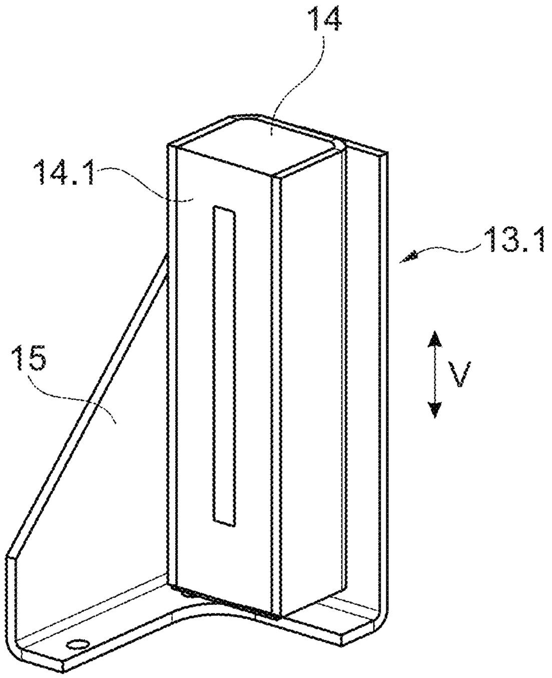
FIG. 3 is a perspective view of an electromagnet of the bounce damper according to the embodiment of FIG. 2.
Figure 4:
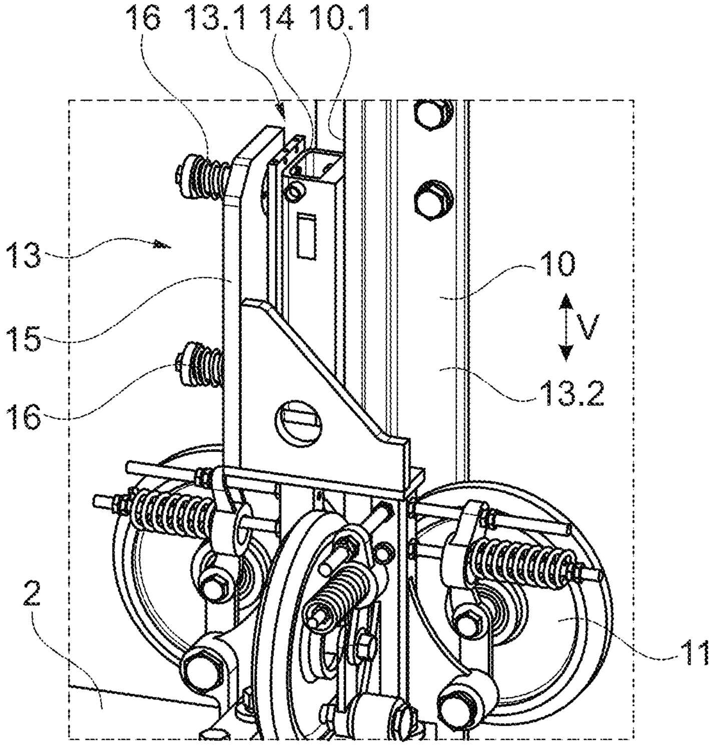
FIG. 4 is a detail view on the bounce damper on the elevator car of FIG. 2.

FIGS. 3 and 4 show detailed views on the first element 13.1 according to FIG. 2, which is formed by an electromagnet 14, which is mounted to a frame 15, wherein the frame 15 is mounted on the elevator car 2. The electromagnet 14 has a surface 14.1 which extends in the vertical direction V and is configured to be located adjacent to a surface 10.1 of the guiding rail 10. The electromagnet 14 can be supplied with current and thereby magnetized by means not shown in the figures. The electromagnet 14 is mounted on frame 15 in a moveable manner against springs 16, so that the electromagnet 14 is spring-loaded in the direction of a first position as is shown in detail in FIG. 5 and FIG. 6, which show crosssectional views.

Figure 5:
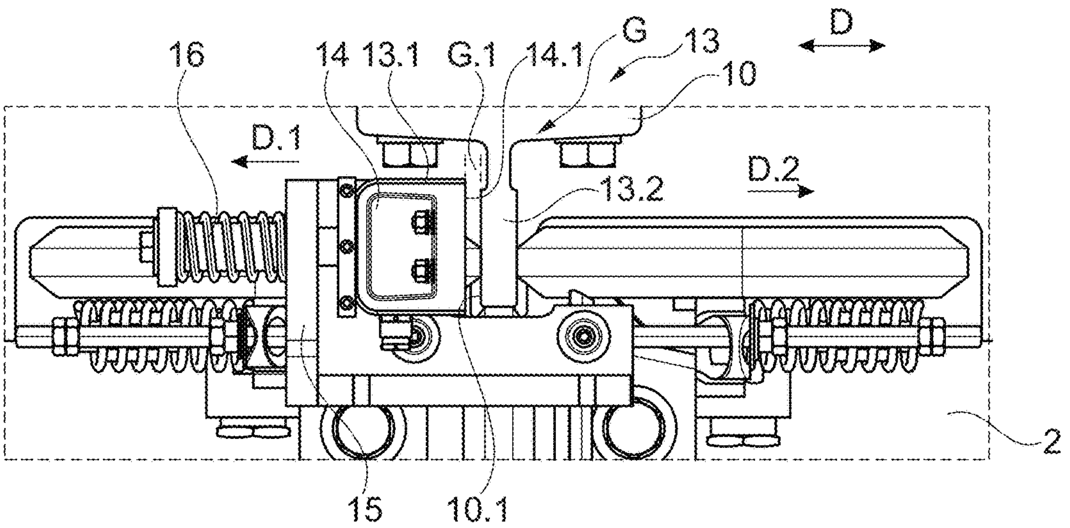
FIG. 5 is a crosssectional view of the bounce damper of FIG. 4 in a first position.
Figure 6:
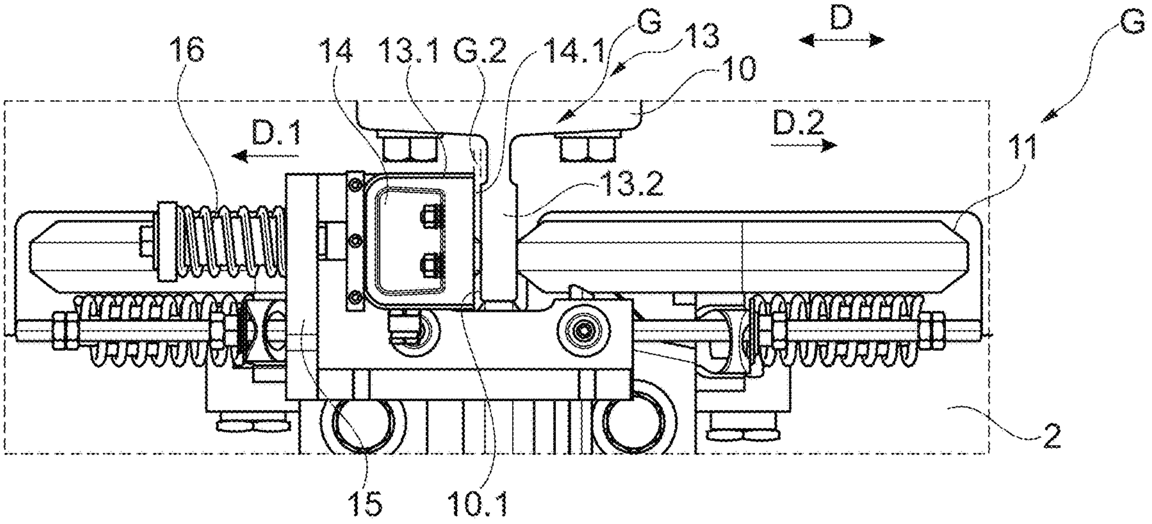
FIG. 6 is a crosssectional view of the bounce damper of FIG. 4 in a second position.

FIG. 5 shows the bounce damper 13 in a first position, wherein the electromagnet 14 is pulled in a horizontal direction D along a first orientation D.1 by the springs 16, so that a gap G of a first length G.1 arises between the surface 14.1 of the electromagnet 14 and the surface 10.1 of the guiding rail 10 adjacent to the surface 14.1. The bounce damper 13 takes this first position, when the electromagnet 14 is not magnetized. If the electromagnet 14 is magnetized, a magnetic force arises, which is directed in the horizontal direction D and which attracts the guiding rail 10 and the electromagnet 14 against each other into a second position, as shown in FIG. 6. Due to the magnetic attraction, the electromagnet 14, which is moveable in the horizontal direction D is pulled towards the guiding rail 10 against the spring-load of the springs 16 and a gap G of a second length G.2 arises in a second position of the bounce damper 13. While the first length G.1 is sufficiently wide, e.g. 5 millimeters, to move the elevator car 2 along the guiding rail 10 without disturbance of the bounce damper 13, the second length G.2 is sufficiently short, e.g. 1 millimeter, to generate a magnetic force between the electromagnet 14 and the guiding rail 10 in the horizontal direction D, which holds the two elements 13.1, 13.2 together in the vertical direction V and thus holds the elevator car 2 against the guiding rail 10. Thereby, bouncing of the elevator car 2 is dampened, while with the second length G.2 of the gap G, the elements 13.1, 13.2 are still spaced apart from each other.

Figure 7:
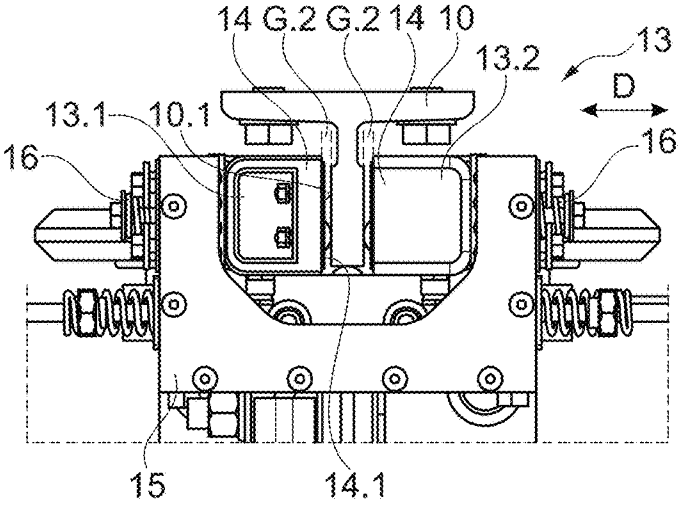
FIG. 7 is a crosssectional view of a bounce damper according to another embodiment of the invention.

FIG. 7 shows another embodiment of a bounce damper 13 in a second position, which includes two electromagnets 14, mounted on each side of the guiding rail 10 in the same manner as within the bounce damper 13 described with reference to FIGS. 2 to 6. With the second electromagnet 14, the directions of forces and movements between the first position and the second position are mirror-inverted. In this embodiment, the sum of surface area to generate a magnetic force between the elements 13.1, 13.2 is increased compared to the predescribed embodiment.

Figure 8:
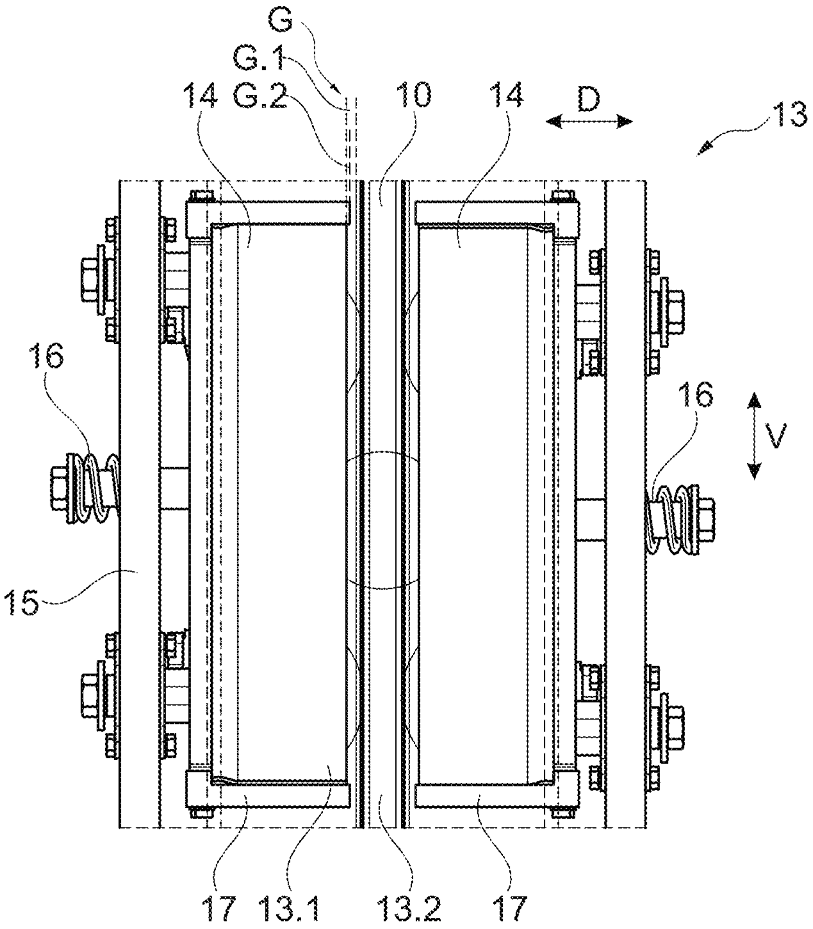
FIG. 8 is a perspective view of an elevator car with a bounce damper according to another embodiment of the invention.

FIG. 8 shows yet another embodiment of the bounce damper 13 in the first position, wherein the bounce damper 13 is similar to the embodiment of FIG. 7 in that it has two electromagnets 14, one on each side of the guiding rail 10. On each of these electromagnets 14, a pair of spacers 17 is fastened, which protrude into the gap G. The spacers 17 are located apart from the electromagnet 14, namely next to it, and are configured to contact with the surface 10.1 in the second position and stop the movement of the electromagnet 14 due to the attraction between the elements 13.1, 13.2. The spacers 17 thereby define the gap G in the second position, thus the second length G.2.

Figure 9:
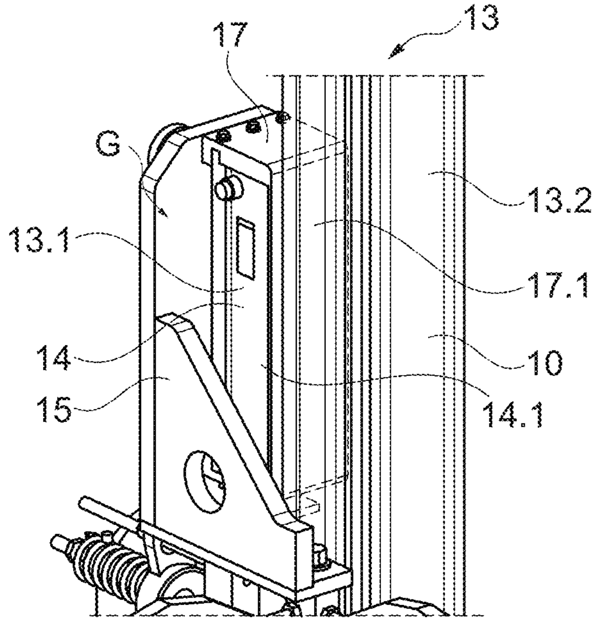
FIG. 9 is a crosssectional view of the bounce damper of FIG. 8.

In another similar embodiment shown in FIG. 9 in perspective view, a spacer single 17 extends over the surface 14.1 of the electromagnet 14 and is thus located in the gap G, while having a surface 17.1, which is in contact with the guiding rail 10 in the second position. The spacers 17 as of the embodiments in FIGS. 8 and 9 may be formed from plastic materials as they are in contact with the guiding rail 10. Plastic materials have a good wear resistance at low friction coefficients, while being non-magnetic.

Figure 10:
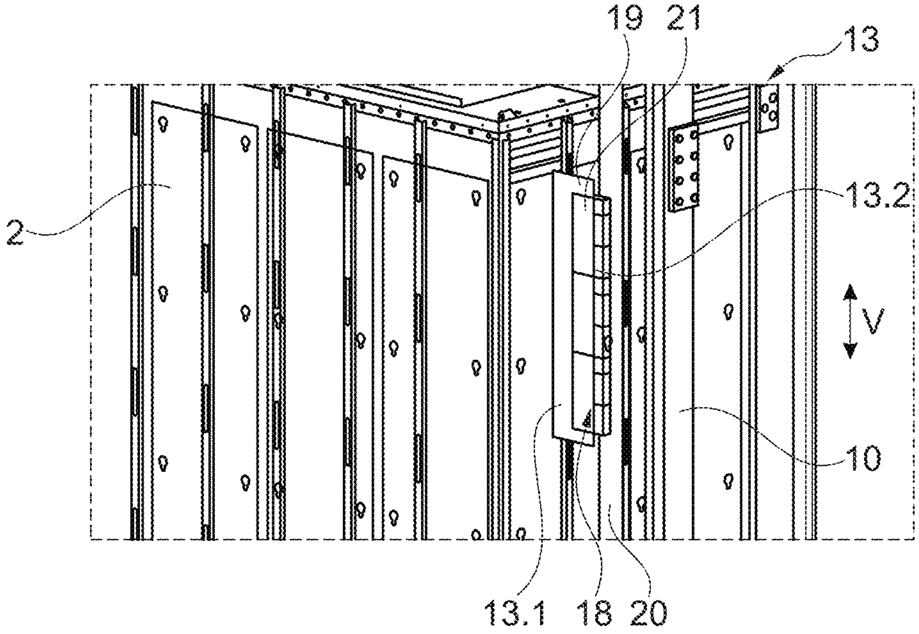
FIG. 10 is a perspective view of an elevator car with a bounce damper according to another embodiment of the invention.
Figure 11:
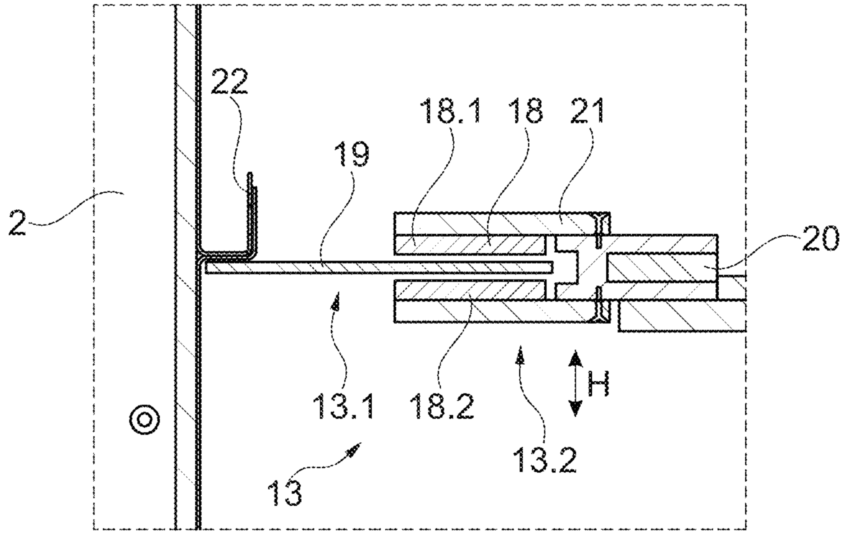
FIG. 11 is a crosssectional view of the bounce damper of FIG. 10.

FIGS. 10 and 11 show another embodiment of a bounce damper 13 at a stop of the elevator car 2, wherein in the elevator shaft 1, a magnet 18 is mounted on frame 21, which is mounted on a mounting rail 20, while at the elevator car 2, a conductor 19 is mounted on a frame 22. The conductor thus forms the first element 13.1 and the magnet 18 forms the second element 13.2. The magnet 18 has a north pole 18.1 and a south pole 18.2, between which a magnetic field is generated in a horizontal direction H. The conductor 19 protrudes into the magnetic field, so that eddy currents are induced in the conductor 19 and a force in the vertical direction V occurs, which dampens bouncing of the elevator car 2. In the embodiment shown in FIGS. 10 and 11, the magnet 18 is an electromagnet, which generated the magnetic field only when magnetized, and which is configured to be magnetized only if the elevator car 2 is at the respective stop, so that during movement of the elevator car 2, the conductor 19 can pass along the magnet 18 without any eddy currents occur and break the elevator car 2 unintentionally. The conductor 19 is fastened to the elevator car 2 in a rigid manner in all directions.

Figure 12:
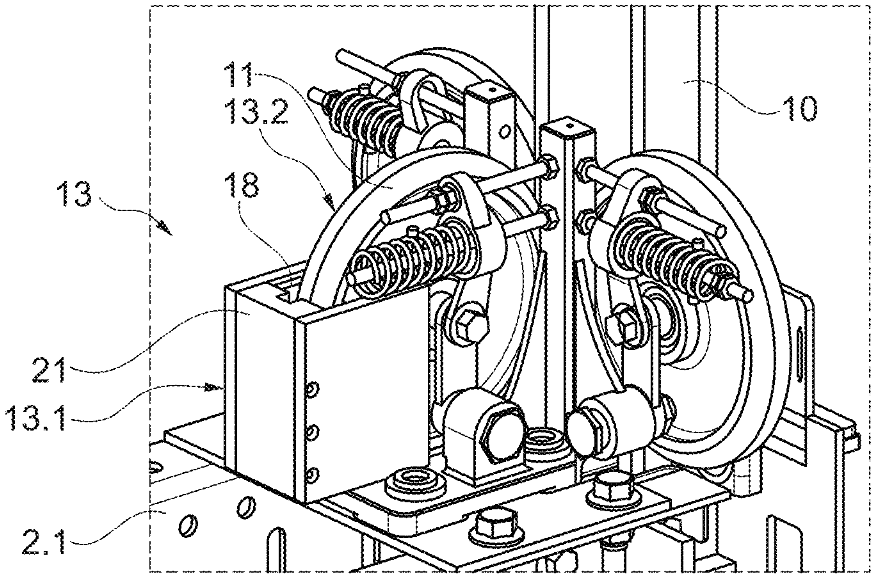
FIG. 12 is a perspective view of an elevator car with a bounce damper according to yet another embodiment of the invention.
Figure 13:
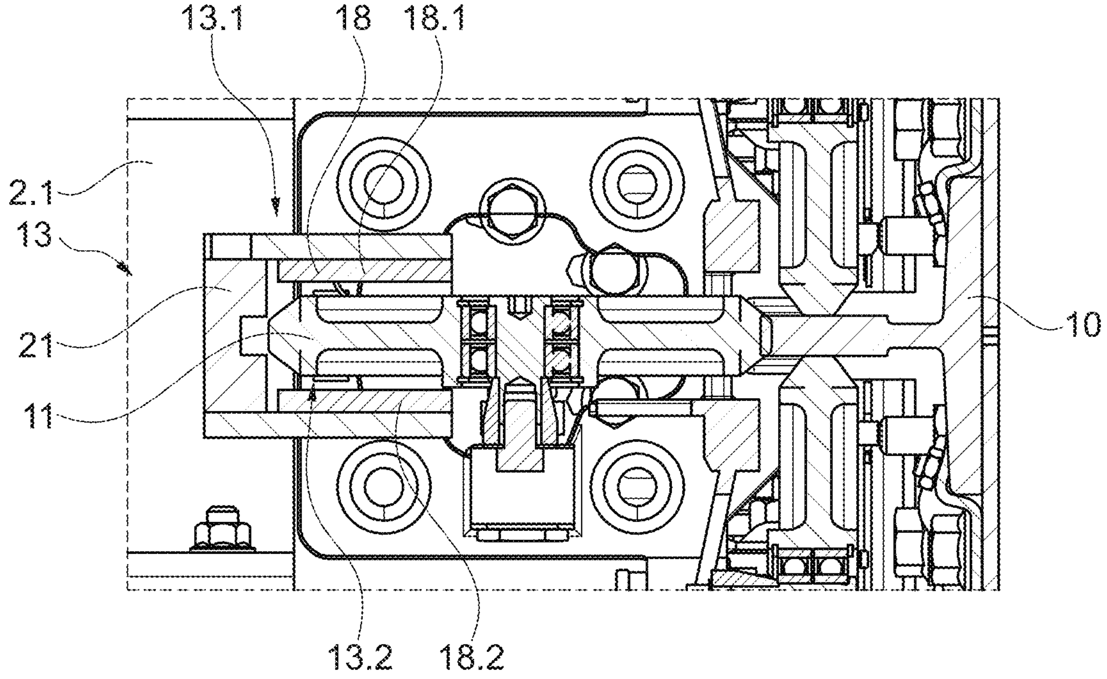
FIG. 13 is a crosssectional view of the bounce damper of FIG. 12.

FIGS. 12 and 13 show another embodiment of a bounce damper 13 working with eddy currents. Here, the magnet 18 is fastened to the car frame 2.1 by the frame 21 and receives one of the guiding wheels 11 between the north pole 18.1 and the south pole 18.2, thus in the magnetic field. The guiding wheel 11 is configured to roll along the guiding rail 10 and has a rubber surface in contact with the guiding rail 10, thus the guiding wheel 11 is in connection with the guiding rail 10, respectively with the elevator shaft 1. Here, the magnet 18 forms the first element 13.1 and the wheel 11 forms the conductor 19 and thus the second element 13.2. The magnet 18 again is an electromagnet and when magnetized induces eddy currents in the guiding wheel 11 so that the guiding wheel 11 is hold fast. The guiding wheel 11 then dampens bouncing of the elevator car 2 by being in friction contact with the guiding rail 10.

The invention claimed is:

1. A bounce damper for an elevator car being moveable in a vertical extending elevator shaft by a tension member, the bounce damper comprising:

a first element configured to be fastened to the elevator car; and at least one second element configured to be fastened to or to be in mechanic connection to the elevator shaft at a stop of the elevator car;

wherein, when the elevator car is at the stop, the first element and the second element are located adjacent to each other in a first horizontal direction defining a first gap;

wherein one out of the first element or second element is an electromagnet;

wherein the other out of the first element or second element is an armature being attracted to the electromagnet and moved in the first horizontal direction by a magnetic force, when the electromagnet is magnetized; and wherein the electromagnet and the armature are spaced apart from each other in the first horizontal direction by a second gap that is maintained, when the electromagnet is magnetized, wherein the first gap is wider than the second gap.

2. The bounce damper of claim 1, wherein the first element is the electromagnet and the second element is the armature.

3. The bounce damper according to claim 2, wherein the armature is formed by or fastened to a guiding rail mounted in the elevator shaft for guiding the elevator car along the elevator shaft.

4. The bounce damper of according to claim 1, wherein at least one out of the first element or second element is moveable in the first horizontal direction between a first position and a second position;

wherein the at least one out of the first element or second element is spring-loaded in the direction of the first position; and wherein the at least one out of the first element or second element is attracted in the direction of the second position by the magnetic force.

5. The bounce damper according to claim 1, wherein at least one out of the first element or second element comprises a non-magnetic spacer;

wherein the spacer contacts the other out of the first element or second element to determine the gap, when the electromagnet is magnetized.

6. The bounce damper of claim 5, wherein the spacer is from a plastic material.

7. The elevator car configured to be moveable in the vertical extending elevator shaft by a tension member, comprising a magnet of the bounce damper according to claim 1.

* * * * *